March 3, 1970  A. J. WILDEY ET AL  3,498,488
SKIDDER WITH REAR PIVOT LIMITING MEANS
Filed Aug. 27, 1968  2 Sheets-Sheet 1

INVENTORS.
ALLAN J. WILDEY
BY COLIN TAYLOR
Tweedie & Gebhardt
ATTORNEYS.

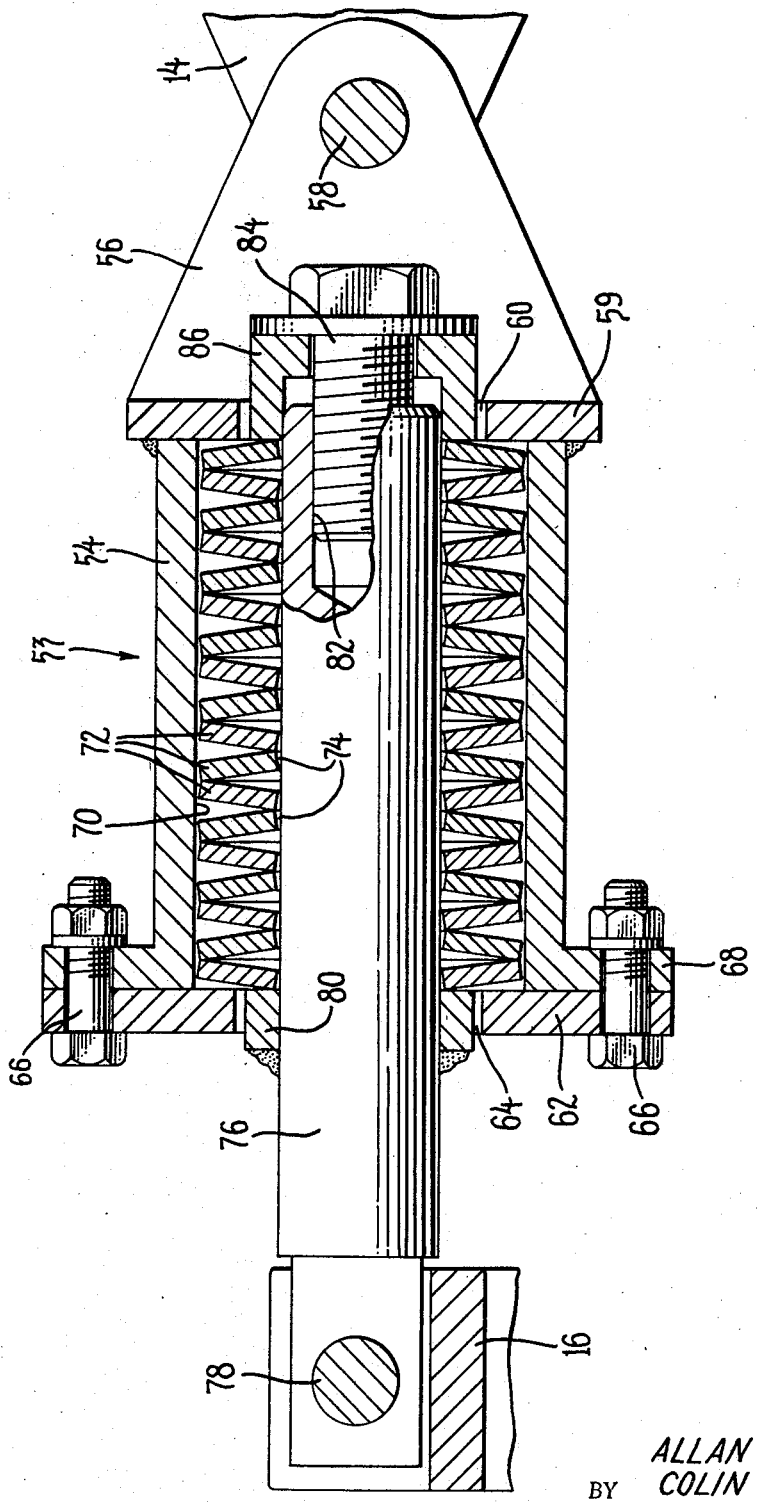

United States Patent Office 3,498,488
Patented Mar. 3, 1970

3,498,488
SKIDDER WITH REAR PIVOT LIMITING MEANS
Allan J. Wildey, Markham, Ontario, and Colin Taylor, Newmarket, Ontario, Canada, assignors, by mesne assignments, to Massey-Ferguson, Inc., Des Moines, Iowa, a corporation of Maryland
Filed Aug. 27, 1968, Ser. No. 755,532
Int. Cl. B60p 1/00
U.S. Cl. 214—523
5 Claims

ABSTRACT OF THE DISCLOSURE

A log skidder includes a front section mounting drive wheels, a power plant and an operator's cab; a center section pivoted to the front section about a substantially vertical axis; a rear section including a winch, an arch, and drive wheels; and means pivoting the center and rear sections together for relative pivotal movement about an axis extending substantially longitudinally of the skidder. A spring unit is connected between the center and rear sections for increasingly resisting the relative pivotal movement of the center and rear sections.

---

This invention relates generally to articulated logging vehicles and more specifically to means for resisting relative pivotal movement between two of the vehicle sections.

Conventional vehicles for dragging or skidding logs, generically known as log skidders, are provided with means permitting relative pivotal movement between the vehicle sections mounting the drive wheels about both vertical and horizontal axes. Pivotal movement about the longitudinal axis enables the skidder to accommodate rough terrain by permitting the vehicle section carrying the rear wheels to angle relative to the vehicle section carrying the front wheels through an arch of between 15 and 30 degrees in either direction from the normal position. Such pivotal movement is conventionally free of any resistance other than friction.

Conventionally, winching of logs from a remote spot to a position against the skidder butt plate is accomplished longitudinally of the skidder. This arrangement is the most stable and powerful for the skidder and winch. However in the rugged terrain of many forests, the logs must be winched side hill and a longitudinal orientation of the skidder would be impractical because of the possibility of tipping or rolling the skidder downhill. In such a situation, the skidder is normally positioned facing up or downhill and the logs are winched laterally of the skidder. Also lateral winching is often necessitated because of restricted maneuverability.

Since in lateral winching the winch cable is pulled against an arch roller elevated from the ground, the winching of the logs creates a moment tending to overturn the skidder. Since normally the winch mounting rear skidder section is freely oscillatable, such side hill winching will generally pivot the rear section relative to the front section to the limit of abutting frame members, thereby elevating the arch rollers and increasing the moment tending to overturn the skidder.

It is therefore an object of this invention to provide means for resisting the relative pivotal movement of the front and rear skidder sections to provide increased stability during lateral winching.

In accordance with this invention, a vehicle is provided having a front section including drive wheels, a rear section including drive wheels, means for driving the wheels, means interconnecting the front and rear section including pivot means permitting relative pivotal movement between the sections about an axis extending substantially longitudinally of the vehicle from a normal position in either rotational direction, and resistance means for increasingly resisting the relative pivotal movement of the front and rear sections away from the normal position.

Other objects, advantages and features of this invention will become more readily apparent upon reference to the following detailed description of a preferred embodiment, as shown in the accompanying drawings, wherein:

FIG. 3 is an enlarged sectional view taken generally along lines 3—3 of FIG. 2 and showing the details of the pivot resistance means.

Figure 1:
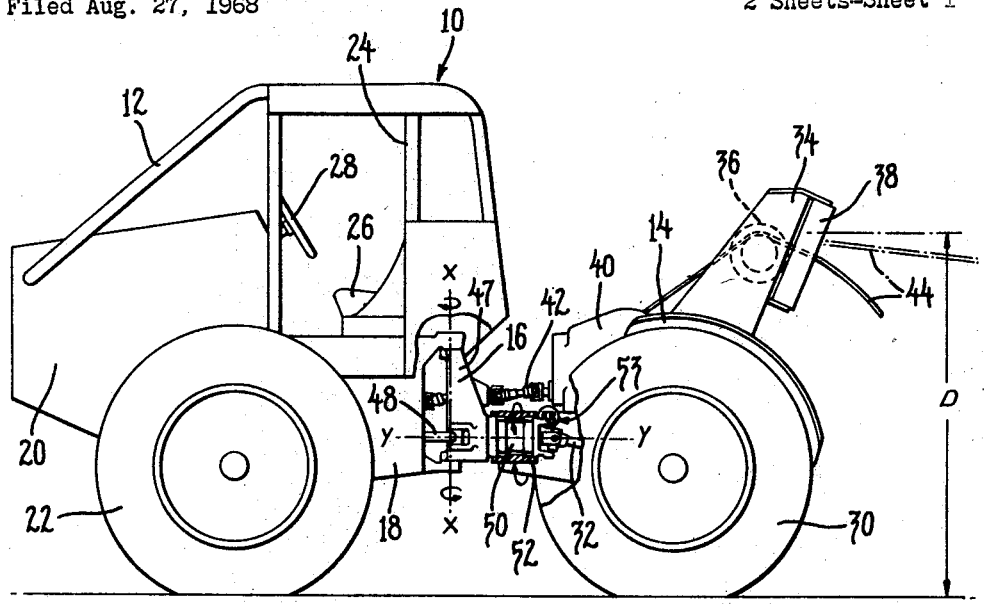
FIG. 1 is a side elevation of a skidder partially broken away to show the pivot resistance means according to this invention.
Figure 2:
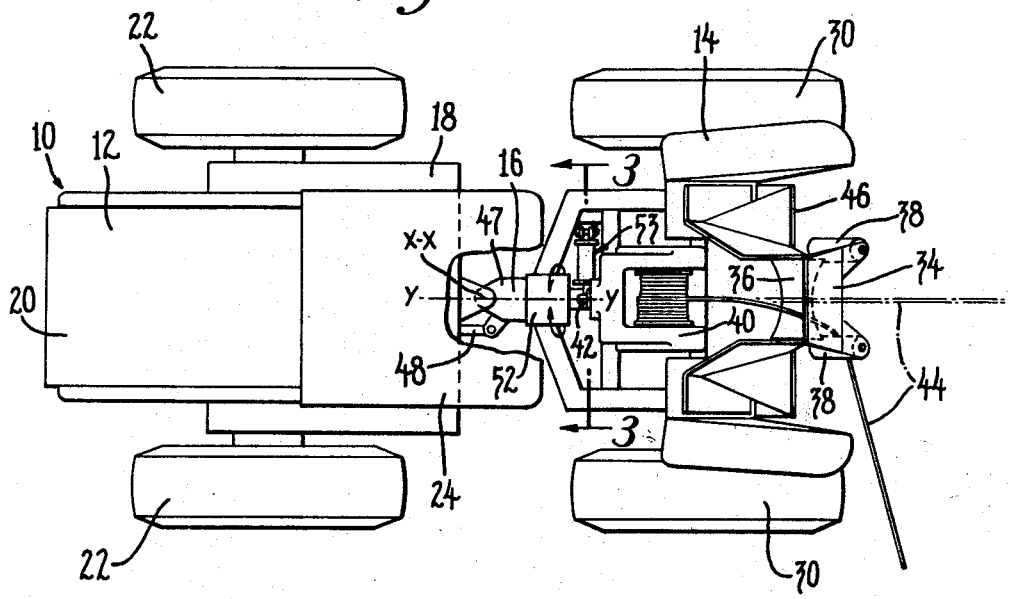
FIG. 2 is a plan view of the skidder shown in FIG. 1.

Referring now to FIGS. 1 and 2 of the drawings, a log skidder 10 includes a front section 12, a rear section 14, and an interconnecting center section 16. The front section 12 includes a frame 18 which mounts an engine (not shown) enclosed within a forward hood 20. Frame 18 further mounts a pair of drive wheels 22 conventionally driven by the engine, and a protective operator's cab 24 enclosing a seat 26 and a steering wheel 28.

The rear section 14 includes a pair of drive wheels 30 which are conventionally driven by the engine through the center section 16 by a drive train 32. Rear section 14 further includes a logging arch 34 provided with a main lower and side fairlead rollers 36 and 38, respectively. A winch 40 driven by a drive train 42 from the engine, includes a driven cable 44 which extends over roller 36 for winching logs to a position against the butt plate 46.

The center section 16 is pivoted by a structure 47 to front section 12 about a substantially vertical axis X—X. Such relative pivotal movement is effected by an output arm 48 of a hydraulic jack (not shown) to steer the skidder by articulation. The center section 16 includes a rearwardly directed axle 50 which is engaged, through bearings, by a mating housing 52 mounted on the rear section 14 to enable relative pivotal movement of the rear and center sections about a generally longitudinally extending axis Y—Y to permit drive wheels 30 to roll in either direction relative to drive wheels 22.

With this arrangement the skidder 10 may be operated over rough terrain, wherein the rear section 14 pivots about axis Y—Y, to the stump to begin winching and skidding. As shown in phantom lines in FIGS. 1 and 2, the cable may be extended to choke logs at a remote location (not shown) and winched in longitudinally of the skidder against butt plate 46. As shown in solid lines in FIGS. 1 and 2, when it is desired to winch laterally of the skidder, cable 44 is directed against one of the side rollers 38. Since the winch cable is pulling from a height above the ground D, the force of winching times the distance D will equal a substantial movement tending to pivot the vehicle rear section 14 about axis Y—Y. If unrestrained, the rear section would tip about the left wheel 30, eleating the arch rollers and increasing the distance D which would increase the tipping movement. Elevation of the rear section 14 would also increase the possibility of tipping the entire skidder, since the tipping would occur in two stages—rear section, then front and center sections.

To resist such relative pivotal movement and tipping of rear section 14, a spring resistance unit 53 is provided, as now will be described with particular reference to FIG. 3.

The spring unit 53 includes a generally cylindrical housing 54 having a right end bracket 56 which is pivoted by a pin 58 to a portion of the skidder rear section 14. The housing includes a right end plate 59, having a central aperture 60, and a left end plate 62, having a central aperture 64, which is bolted at 66 to an annular flange 68 of housing 54. The housing has a cylindrical bore 70 which confines a plurality of oppositely disposed, annular, dished, apertured Belleville spring washers 72, each provided with a central aperture 74.

A cylindrical rod or arm 76 is pivoted at its left end by a pin 78 to a portion of the skidder center section 16. The rod 76 extends completely through apertures 64 and 74 and mounts an annular abutment 80 at its left end. At its right end rod 76 includes a threaded bore 82 which receives a bolt 84 that adjustably secures an annular abutment 86 to the right end of rod 76. As shown in FIG. 3, the abutments 80 and 86 fit within respective apertures 64 and 60 and engages the respective left and right end spring washers 72.

Referring again to FIGS. 1 and 2, the spring unit 53 interconnects the center and rear sections along a line spaced from axis Y—Y. Therefore, upon relative pivotal movement of the rear and center sections, rod 76 will move axially of cylinder 54 and the spring washers will be compressed against one of the end walls by one of the abutments. For example, movement of the rear section counterclockwise, as viewed from the rear of the skidder, will project arm 76 inwardly of housing 54, thereby causing abutment 80 to compress the spring washers 72 against the right end plate 59. Similarly, relative pivotal movements between the center and rear sections clockwise, as viewed from the rear of the skidder, will cause abutment 86 to compress the spring washers 72 against the left end plate 62.

As the winching force tending to relatively pivot the skidder rear and center sections increases, the spring washers 72 are increasingly compressed, thereby providing an increased resistance to any further pivotal movement. In this manner, any skidder rear section tipping caused by lateral winching will be resisted by the spring unit 53, because relative pivoting of the rear and center sections about axis Y—Y will be opposed by the progressive compression of spring washers 72.

Thus, a greater winching force would be required to tip the skidder, since it would have to be tipped as a unit, rather than section-by-section. This provides safer and better lateral winching by the skidder.

It is readily apparent that many modifications could be made to this invention. For example, this invention could be adapted to a vehicle having different physical characteristics; a different type of spring could be used in tension or compression; or a different type of resistance unit could be used.

What is claimed is:

1. In a material handling vehicle having a front section including drive wheels, a rear section including drive wheels, material handling means on the rear section for handling a load, means for driving the wheels, a center section, means interconnecting the front and center sections and permitting articulated movement therebetween about a substantially vertical first axis, and means interconnecting the center and rear sections for relative pivotal movement between the sections about a second axis extending substantially longitudinally of the vehicle, from a normal position in either rotational direction, the improvement comprising: resistance means for increasingly resisting the relative pivotal movement of the center and rear sections away from the normal position, including a spring unit oriented laterally of the vehicle and having its ends attached to the center and rear sections at points radially spaced from the longitudinal pivot axis.

2. A log skidder vehicle comprising: a front section including a power plant, drive wheels, and means drivingly interconnecting the power plant and drive wheels, a rear section including drive wheels, a butt plate, a logging arch, and a winch having a cable supported by the arch for pulling logs to a position against the butt plate, a center section, means interconnecting the front and center sections for articulated movement about a substantially vertical first axis, means interconnecting the rear and center sections for relative pivotal movement about a second axis extending substantially longitudinally of the vehicle, from a normal position in either rotational direction, means drivingly interconnecting the power plant and the rear drive wheels, means drivingly interconnecting the power plant and the winch, and resistance means extending between the rear and center sections for resisting the relative pivotal movement of the rear and center sections away from the normal position, thereby stabilizing the skidder when the winch is pulling logs generally laterally of the skidder, the resistance means including a spring unit oriented laterally of the vehicle and having its ends attached to the rear and center sections at points radially spaced from the longitudinal axis.

3. The log skidder vehicle of claim 2, wherein: the spring unit includes a spring increasingly stressed by progressive relative pivotal movement of the rear and center sections in either direction.

4. The vehicle of claims 1 or 2, wherein: the spring unit includes a housing having opposed ends mounted on one of the sections, a spring confined within the housing between the ends, and a member mounted on the other section and having spaced abutments engaging the spring ends, whereby, upon relative pivotal movement of the rear and center sections in either direction, one of the abutments compresses the spring against one of the housing ends.

5. The apparatus of claims 1 or 2, wherein: the spring unit includes a cylindrical housing pivoted to one of the sections and having opposed apertured end plates, a plurality of apertured annular spring washers confined within the housing, an arm pivoted to the other section and extending through the apertured end plates and spring washers, and a pair of spaced abutments mounted on the arm and engageable with the end spring washers, whereby, upon relative pivotal movement of the center and rear sections in either direction, the arm moves axially of the housing and one of the abutments compresses the spring washers against one of the end plates to progressively stress the spring washers, thus progressively resisting such relative pivotal movement.

References Cited

UNITED STATES PATENTS

| | | | |
|---|---|---|---|
| 2,537,245 | 1/1951 | Thompson | 280—485 |
| 2,827,715 | 3/1958 | Wagner | 180—51 XR |
| 3,129,957 | 4/1964 | Bernard et al. | 280—406.1 |
| 3,363,714 | 1/1968 | Orpana | 180—51 XR |
| 2,027,046 | 1/1936 | Kuchar | 280—484 |
| 2,475,825 | 7/1949 | Dufour | 180—14 |

ALBERT J. MAKAY, Primary Examiner

U.S. Cl. X.R.

180—51; 280—483; 254—139.1